US008957961B2

(12) United States Patent
Lu

(10) Patent No.: US 8,957,961 B2
(45) Date of Patent: Feb. 17, 2015

(54) METHOD AND SYTEM FOR TELECINE DETECTION AND RESTORATION

(75) Inventor: Ning Lu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1666 days.

(21) Appl. No.: 11/647,020

(22) Filed: Dec. 27, 2006

(65) Prior Publication Data

US 2008/0158350 A1 Jul. 3, 2008

(51) Int. Cl.
*H04N 3/36* (2006.01)
*H04N 9/11* (2006.01)
*G11B 27/034* (2006.01)
*H04N 7/01* (2006.01)

(52) U.S. Cl.
CPC ............ *G11B 27/034* (2013.01); *H04N 7/0115* (2013.01)
USPC .......................................................... 348/97

(58) Field of Classification Search
USPC .................................................. 348/96–112
See application file for complete search history.

(56) References Cited

U.S. PATENT DOCUMENTS

| | | | | |
|---|---|---|---|---|
| 5,384,598 A * | 1/1995 | Rodriguez et al. | ......... | 348/384.1 |
| 5,821,991 A * | 10/1998 | Kwok | .............. | 348/96 |
| 5,929,902 A * | 7/1999 | Kwok | .............. | 348/96 |
| 6,408,024 B1 * | 6/2002 | Nagao et al. | ............ | 375/240.01 |
| 6,434,196 B1 * | 8/2002 | Sethuraman et al. | .... | 375/240.12 |
| 6,538,688 B1 * | 3/2003 | Giles | .................... | 348/97 |
| 6,724,433 B1 | 4/2004 | Lippman | | |
| 6,906,743 B1 * | 6/2005 | Maurer | ......... | 348/180 |
| 6,965,414 B2 * | 11/2005 | Haraguchi | ............ | 348/441 |
| 7,050,088 B2 * | 5/2006 | Lin | .................. | 348/97 |
| 7,075,581 B1 | 7/2006 | Ozgen et al. | | |
| 7,133,064 B2 | 11/2006 | Lin | | |
| 7,154,555 B2 * | 12/2006 | Conklin | .............. | 348/448 |
| 7,898,599 B2 * | 3/2011 | Lippman | ............ | 348/558 |
| 7,933,328 B2 * | 4/2011 | DeGarrido et al. | ....... | 375/240.03 |
| 8,120,703 B2 * | 2/2012 | Adams | ............ | 348/448 |
| 8,619,187 B2 * | 12/2013 | Garg et al. | .............. | 348/441 |
| 2001/0028790 A1 * | 10/2001 | Numata | ............ | 386/111 |
| 2002/0064228 A1 * | 5/2002 | Sethuraman et al. | .... | 375/240.12 |
| 2004/0135924 A1 | 7/2004 | Conklin et al. | | |
| 2005/0057646 A1 * | 3/2005 | Cho et al. | ............ | 348/96 |
| 2005/0078176 A1 * | 4/2005 | Yuan et al. | .............. | 348/97 |
| 2006/0007305 A1 * | 1/2006 | Shah | ................ | 348/97 |
| 2006/0012707 A1 | 1/2006 | Chow | | |
| 2006/0044476 A1 | 3/2006 | Lee | | |

(Continued)

FOREIGN PATENT DOCUMENTS

| | | |
|---|---|---|
| EP | 1501298 | 1/2005 |
| WO | WO-2005/032114 | 4/2005 |
| WO | WO-2005/107266 | 11/2005 |

OTHER PUBLICATIONS

"PCT Search Report", PCT/US2007/088991 (Jun. 3, 2008), 3 pgs.

(Continued)

*Primary Examiner* — Backhean Tiv
(74) *Attorney, Agent, or Firm* — Blakely, Sokoloff, Taylor & Zafman LLP

(57) ABSTRACT

A method and system are disclosed. The method includes receiving a video clip including a plurality of frames. The method further includes detecting a telecine cadence of the video clip by comparing a top field and a bottom field of each of the plurality of frames. Further, based on the detected telecine cadence, the method reconstructs the video clip to an original frames-per-second (fps) value.

17 Claims, 5 Drawing Sheets

(56) References Cited

U.S. PATENT DOCUMENTS

2006/0109899 A1   5/2006   Kablotsky
2006/0171457 A1*  8/2006   DeGarrido et al. ...... 375/240.03
2007/0139552 A1*  6/2007   Jia et al. ........................ 348/448
2008/0158350 A1*  7/2008   Lu ................................... 348/97

OTHER PUBLICATIONS

"EP Search Report", 07870002.8-2202/2098071, 3 pages.

* cited by examiner

| Cadences | Periodicity | Frame patterns |
|---|---|---|
| 60i<br>30 fps | 1 | T0B1 T2B3 T4B5 T6B7 T8B9 ...<br>FRP: 0 0 0 0 0 ...<br>ITL: 1 1 1 1 1 ...<br>PFF: 0 0 0 0 0 ... |
| 2:2 (30p)<br>30 fps | 1 | T0B0 T1B1 T2B2 T3B3 T4B4 ...<br>FRP: 0 0 0 0 0 ...<br>ITL: 0 0 0 0 0 ...<br>PFF: 0 0 0 0 0 ... |
| 3:2<br>24 fps | 5 | T0B0 T0B1 T1B2 T2B2 T3B3 T4B4 T4B5 T5B6 T6B6 T7B7<br>FRP: 0 1 0 2 0 0 1 0 2 0 ...<br>ITL: 0 1 1 0 0 0 1 1 0 0 ...<br>PFF: 0 1 1 1 0 0 1 1 1 0 ... |
| 2:3<br>24 fps | 5 | T0B0 T1B0 T2B1 T2B2 T3B3 T4B4 T5B4 T6B5 T6B6 T7B7<br>FRP: 0 2 0 1 0 0 2 0 1 0 ...<br>ITL: 0 1 1 0 0 0 1 1 0 0 ...<br>PFF: 0 2 2 2 0 0 2 2 2 0 ... |
| 2:3:3:2<br>24 fps | 5 | T0B0 T0B1 T1B2 T2B3 T3B3 T4B4 T4B5 T5B6 T6B7 T7B7<br>FRP: 0 1 0 0 2 0 1 0 0 2 ...<br>ITL: 0 1 1 1 0 0 1 1 1 0 ...<br>PFF: 0 1 1 1 1 0 1 1 1 1 ... |
| 2:2:2:4<br>24 fps | 5 | T0B0 T1B1 T2B2 T3B3 T3B3 T4B4 T5B5 T6B6 T7B7 T7B7<br>FRP: 0 0 0 0 3 0 0 0 0 3 ...<br>ITL: 0 0 0 0 0 0 0 0 0 0 ...<br>PFF: 0 0 0 0 3 0 0 0 0 3 ... |
| 3:2:3:2:2<br>24 fps | 6 | T0B0 T1B1 T1B2 T2B3 T3B3 T4B4 T5B5 T6B6 T6B7 T7B8<br>FRP: 0 0 1 0 2 0 0 0 1 0 2 0 ...<br>ITL: 0 0 1 1 0 0 0 0 1 1 0 0 ...<br>PFF: 0 0 1 1 1 0 0 0 1 1 1 0 ... |
| 6:4<br>12 fps | 5 | T0B0 T0B0 T0B0 T1B1 T1B1 T2B2 T2B2 T3B3 T3B3 T3B3<br>FRP: 0 3 3 0 3 0 3 3 0 3 ...<br>ITL: 0 0 0 0 0 0 0 0 0 0 ...<br>PFF: 0 3 3 0 3 0 3 3 0 3 ... |
| 5:5<br>12 fps | 5 | T0B0 T0B0 T0B1 T1B1 T1B1 T2B2 T2B2 T2B3 T3B3 T3B3<br>FRP: 0 3 1 2 3 0 3 1 2 3 ...<br>ITL: 0 0 1 0 0 0 0 1 0 0 ...<br>PFF: 0 3 1 1 3 0 3 1 1 3 ... |
| 8:7<br>8 fps | 15 | T0B0 T0B0 T0B0 T0B0 T1B1 T1B1 T1B1 T1B2 T2B2<br>T2B2 T2B2 T2B3 T3B3 T3B3 T3B3 T4B4 T4B4 ...<br>FRP: 0 3 3 3 0 3 3 1 2 0 0 2 1 0 0 0 3 ...<br>ITL: 0 0 0 0 0 0 0 1 0 0 0 1 0 0 0 0 0 ...<br>PFF: 0 3 3 3 0 3 3 1 2 3 3 1 2 3 3 0 3 ... |

Figure 2

METHOD AND SYTEM FOR TELECINE DETECTION AND RESTORATION

FIELD OF THE INVENTION

The embodiments of the invention relate generally to the field of video graphics and, more specifically, relate to video processing and rendering.

BACKGROUND

Digital video is often stored in a different frame rate from an original frame rate. For example, it is common to see video that was originally filmed at a 24 frames-per-second (fps) frame rate, and then before it is written to a digital video disc (DVD) the video is stored at 30 fps (often using the 3:2 cadence pulldown method) to match television (TV) requirements. This process is referred to as telecine cadence. A problem exists in the telecine process. When viewing telecined video on a progressive display monitor, interlacing artifacts repeatedly appear and disappear. This is commonly referred to as the jitter effect. In addition, due to the variety of different telecine cadences and patterns, a problem exists of accurately determining what cadence and pattern was used on a video clip when telecine was preformed.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 illustrates common telecine film cadences;

DETAILED DESCRIPTION

A method and apparatus for telecine cadence detection and restoration is disclosed. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
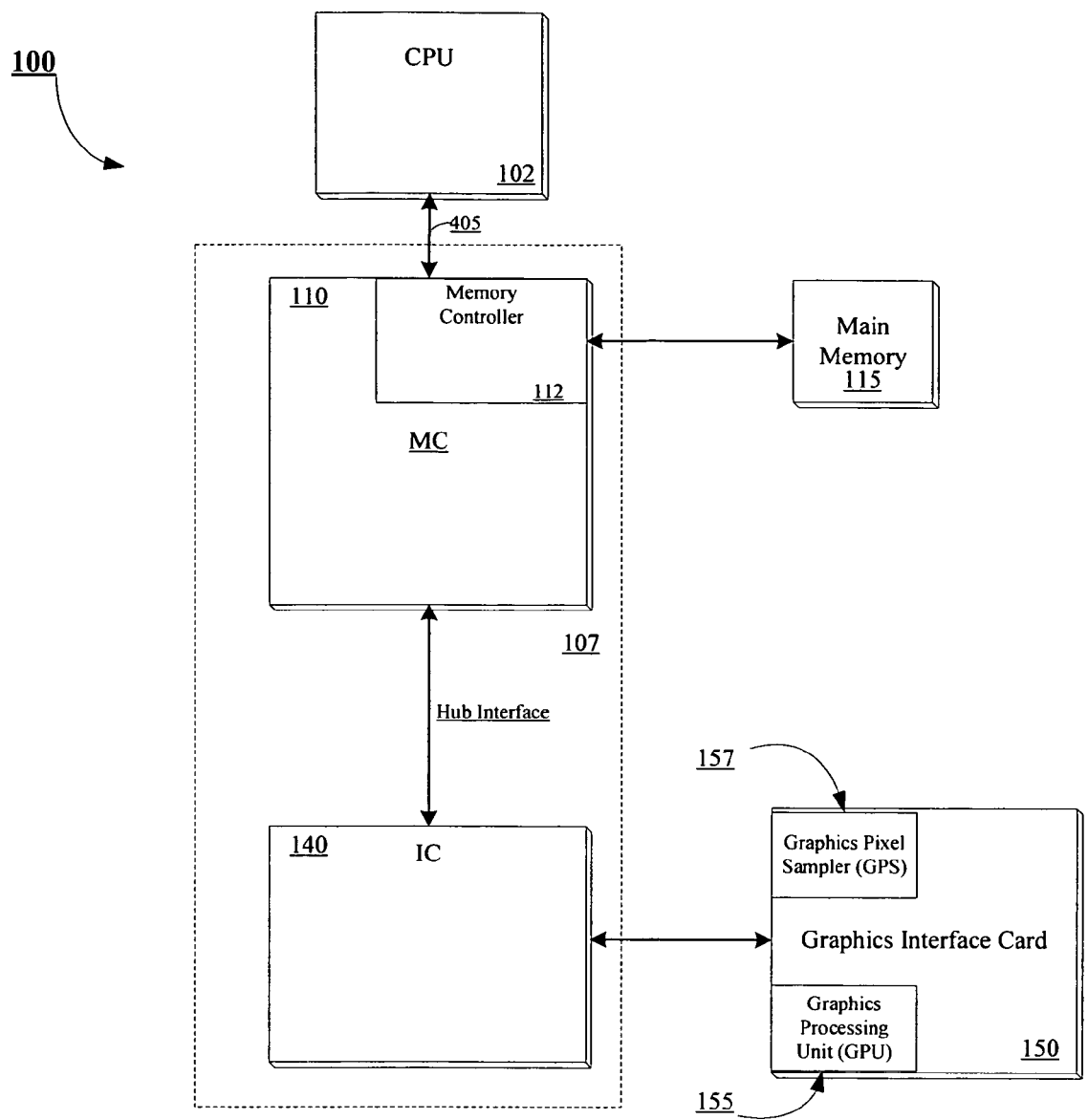
FIG. 1 illustrates a block diagram of one embodiment of a computer system.

FIG. 1 is a block diagram of one embodiment of a computer system 100. Computer system 100 includes a central processing unit (CPU) 102 coupled to interconnect 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented multiple processors, or multiple processor cores.

In a further embodiment, a chipset 107 is also coupled to interconnect 105. Chipset 107 may include a memory control component (MC) 110. MC 110 may include a memory controller 112 that is coupled to a main system memory 115. Main system memory 115 stores data and sequences of instructions that are executed by CPU 102 or any other device included in system 100.

In one embodiment, main system memory 115 includes one or more DIMMs incorporating dynamic random access memory (DRAM) devices; however, main system memory 115 may be implemented using other memory types. Additional devices may also be coupled to interconnect 105, such as multiple CPUs and/or multiple system memories.

MC 110 may be coupled to an input/output control component (IC) 140 via a hub interface. IC 140 provides an interface to input/output (I/O) devices within computer system 100. IC 140 may support standard I/O operations on I/O interconnects such as peripheral component interconnect (PCI), accelerated graphics port (AGP), universal serial interconnect (USB), low pin count (LPC) interconnect, or any other kind of I/O interconnect (not shown). In one embodiment, IC 140 is coupled to a graphics interface card 150. Graphics interface card 150 includes a graphics processing unit (GPU) 155 and a graphics pixel sampler (GPS) 157.

Figure 3:
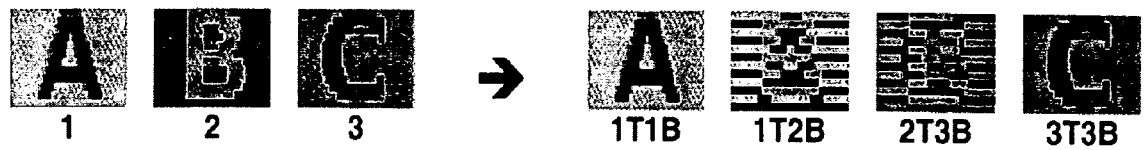
FIG. 3 illustrates an example of telecine being preformed on a video clip.

In one embodiment, graphics interface card 150 is implemented to perform telecine film cadences. FIG. 2 illustrates common telecine film cadences. FIG. 3 illustrates an example of telecine increasing the frame rate of a video clip to 24 fps using a 3:2:3:2:2 pulldown (see row 7 of FIG. 2). Referring back to FIG. 2, the original progressive video frames are divided into pairs of fields. The even lines of a frame form the top field, and the odd lines form the bottom field. The telecine frame rate conversion is done by creating new frames via replicating and interleaving the original frame fields.

The replacing and interleaving is done according to various patterns.

Table 1 Illustrates Three Types of Patterns to be Considered:

TABLE 1

FRP (Field repetition pattern): (2 bits per frame), 1 bit indicates the top field of the current frame is a repetition of the previous frame, and 1 bit indicates the bottom field.
ITL (Interlaced or progressive): (1 bit per frame), 1 bit indicates the current frame is considered interlaced.
PFF (Possible TFF (top-field-first) or BFF (bottom-field-first)): (2 bits per frame), 1 bit indicates that the current top field and the previous bottom field fit into a progressive frame, and 1 bit indicates that the previous top field and the current bottom fit into a progressive frame.

As discussed above, current processes suffer from various problems (e.g. jitter effect). According to one embodiment computer system 100 implements a process that eradicates problems associated with the converse telecine process. The process may be implemented as instructions for a driver associated with graphics interface card 150. In the alternative or in addition to the process may be implemented as an instruction set within graphics interface card 150.

Figure 4:
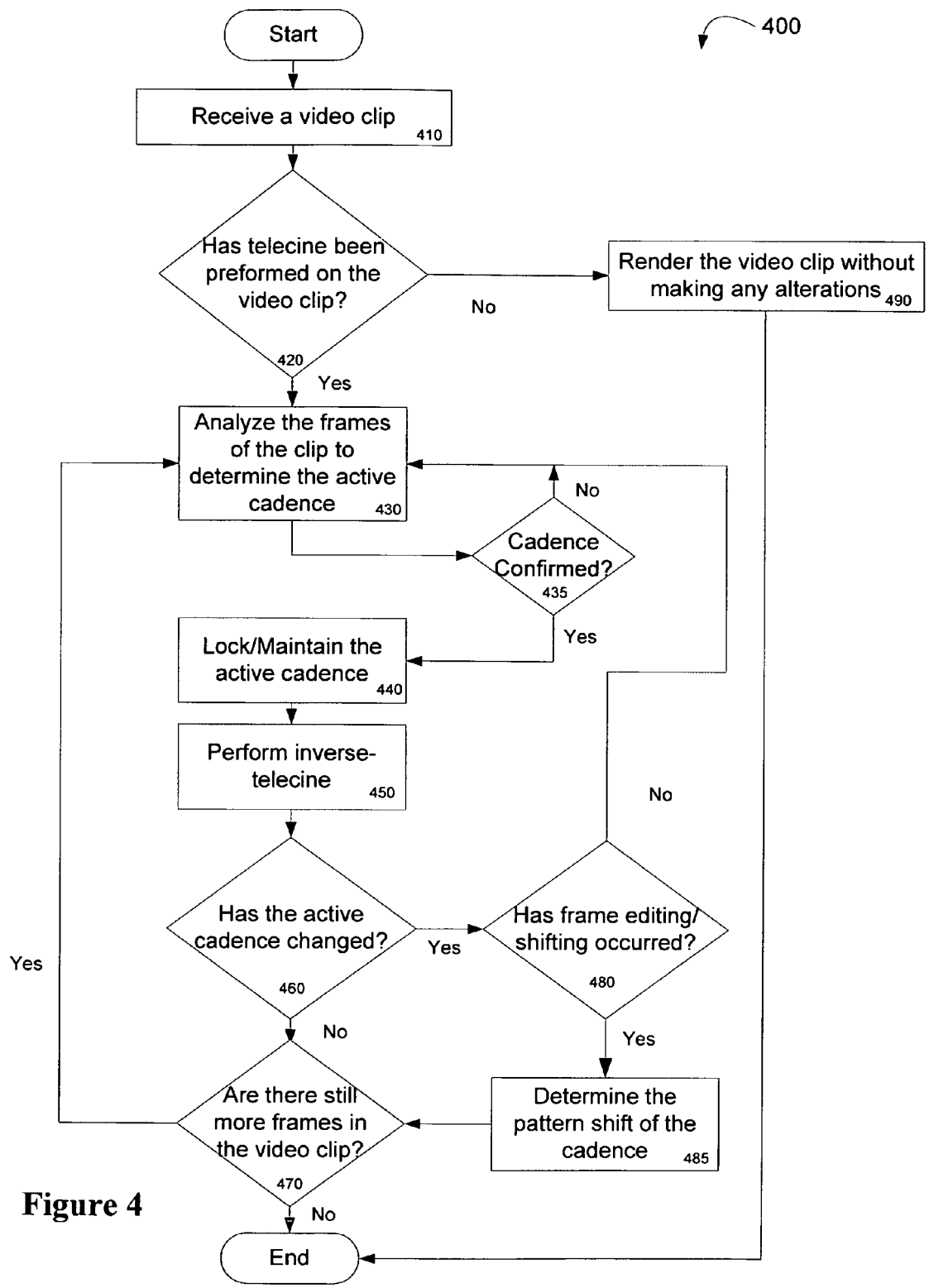
FIG. 4 illustrates one embodiment of a flow diagram illustrating telecine cadence detection, confirmation and reconstruction.

FIG. 4 illustrates one embodiment of a flow diagram 400 for telecine detection and restoration. At processing block 410 a video clip is received. At decision block 420 the video clip is analyzed to determine if telecine has been preformed on the video clip. If telecine has not been preformed on the video clip, the video clip is rendered without any alterations, processing block 490 and the process ends.

However, if telecine has been preformed on the video clip, the frames of the video clip are analyzed to determine the active cadence of the video clip, processing block 430. In one embodiment, the active cadence of the video clip is determined by comparing the frames of the clip. This determination is made within 5 to 10 frames, however other thresholds may be implemented. Each frame may be divided into two fields, a top field and a bottom field. The following are comparisons that may be preformed in order to determine the cadence of the video clip. However, other comparisons may also be preformed.

The current top field of the frame may be compared with the current bottom field frame. Further, the current top field may be compared with the previous bottom field, or with the previous top field. In addition, the current bottom field may be compared with the previous bottom filed, or with the previous top field. These comparisons may be preformed in any order and with any level of frequency. Further the comparisons may be limited to only the luma component of the frames.
Table 2 Illustrates Examples of the Above Comparisons.

TABLE 2

DiffcTpT = Diff(current_frame_top_field, previous_frame_top_field)
DiffcBpB = Diff(current_frame_bottom_field, previous_frame_bottom_field)
DiffcTcB = Diff(current_frame_top_field, current_frame_bottom_field)
DiffcTpB = Diff(current_frame_top_field, previous_frame_bottom_field)
DiffcBpT = Diff(current_frame_bottom_field, previous_frame_top_field)

In a further embodiment, the comparisons in Table 2 are analyzed for cross-frame variances. By analyzing the comparisons the pattern of the cadence can be determined (e.g. FRP, ITL, or PFF). For example, for a progressive frame the average of the DiffcTcB comparison may be expected to be significantly smaller than the averages of the other crossing field differences. Similarly, the DiffcTpB comparison average may be expected to be small for the TFF (PFF=1) pattern, or the DiffcBpT comparison average may be expected to be small for BFF (PFF=2). In one embodiment, these cross frame variances may be used to determine the cadence used in the video clip.

In one embodiment, the comparisons are preformed using a frame difference function, such as mean-square-error, signal-to-noise ratio (PSNR), or sum-absolute-difference (SAD). Nonetheless, other frame difference functions may be used.

In one embodiment, in order to reduce computational complexity, an equally distributed sub-sampling pattern may be used as opposed to performing the difference function calculations on all pixels in the frame. The sub-sampling pattern may include portions of the frames that have the greatest amount of change, in order to have an increase in the difference between each frame. Thus, the likelihood of determining the correct active cadence is increased.

Referring back to FIG. 4, once the active cadence is determined, confirmation of the cadence is attempted, decision block 435. Confirmation of the cadence includes checking that the active cadence and expected cadence to determine if they are consistent. In one embodiment, consistency makes sure the field repetition pattern (FRP) is preserved as all repeated fields having smaller differences comparing any non-repeated fields within the periodicity. If the confirmation of the cadence fails, the process returns to processing block 430, and the frames are analyzed again to determine the correct cadence.

Once confirmation of the cadence occurs, the cadence is locked and/or maintained, processing block 440. Once the cadence is locked, inverse-telecine frame restoration (IVTC) is preformed on the video clip, processing block 445. The type of IVTC performed on the video clip depends on the determined cadence. In one embodiment, if the cadence is determined to be interlaced, then a de-interlacing algorithm may be performed.

In a further embodiment, the inverse telecine process is designed into a pipeline of three components: statistics gathering of variance calculations, logic deduction of cadence decision, and memory re-mapping of frame restoration. In one embodiment, the process includes corresponding computer processing of parallel operations, logic operations, and memory operations respectively. However, other restoration processes and algorithms may be performed.

At decision block 460, the active cadence is re-analyzed to determine whether the cadence has changed. If no change in the cadence is detected, then the video clip is analyzed to determine whether there are still more frames to process, decision block 470. If there are no more frames to process then the process ends. Otherwise, if there are still more frames to process, then the process returns to processing block 430.

If a change in the cadence is detected (decision block 460), then the video clip is further analyzed to determine whether frame editing and/or frame shifting of the video clip has occurred, decision block 480. This determination may include matching possible after-shifting patterns under the same active cadence. After-shifting patterns may include cuts in the video clip, or post filming edits to the video clip. If it is determined that no frame editing and/or shifting has occurred, then the active cadence itself has changed, and a new active cadence is determined, processing block 430.

If editing and/or shifting of the frame has occurred, then the pattern shift is determined, processing block 485. This determination enables the cadence determination process to be film-cutting-and-editing proof. This means that a false determination of a new cadence may not occur due to an edit or a shift.

Once the pattern shift is determined the video clip is analyzed to determine whether there are still more frames to process, decision block 470. If there are no more frames to process the process ends. Otherwise, if there are still more frames to process, then the process returns to processing block 430.

Figure 5:
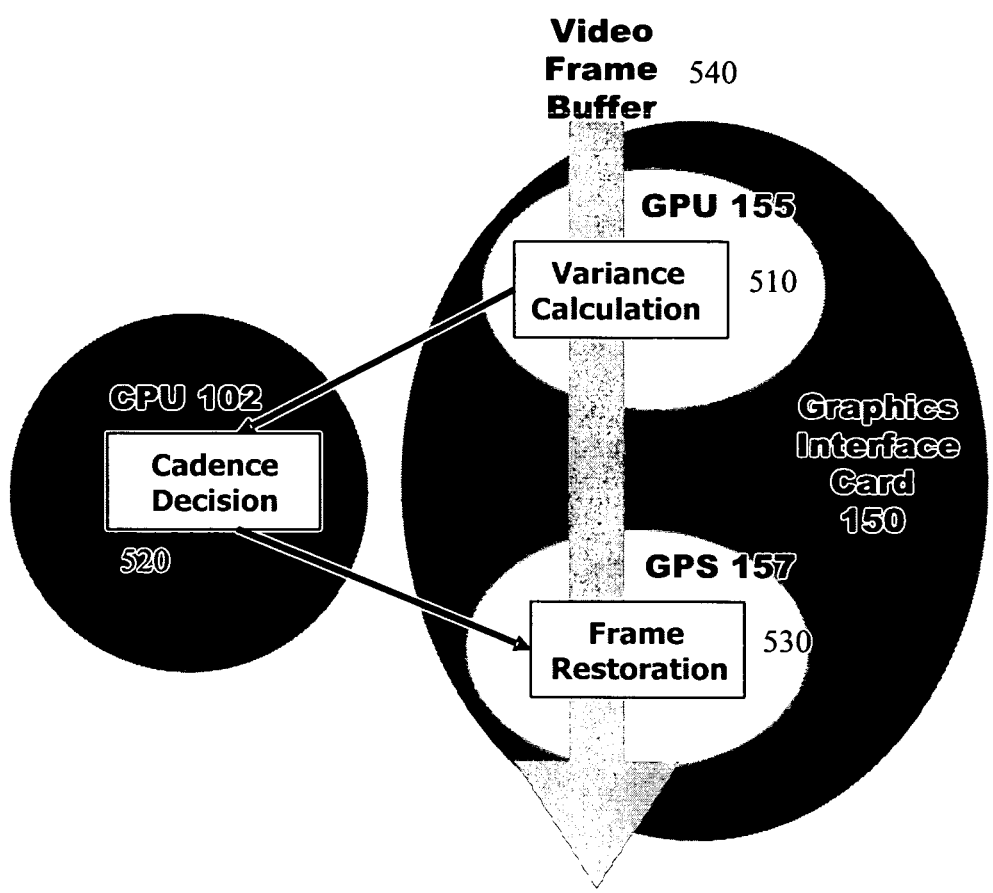
FIG. 5 illustrates one embodiment of a flow diagram illustrating inverse telecine conversion.

FIG. 5 illustrates one embodiment of a flow diagram illustrating inverse telecine conversion. At processing block 510, variances of the current top and bottom fields and previously stored fields are calculated. In one embodiment, these calculations are preformed by GPU 155. At processing block 520, the telecine cadence is detected. In one embodiment, this detection is preformed by CPU 102. At processing block 530, GPS 157 pairs the correct fields of each frame with a frame buffer 540.

The above-described process and mechanism detects telecined frame rate conversion on video clips and restores the video clips to the original frame rate in order to improve progressive display.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   receiving a video clip including a plurality of frames;
   determining a telecine cadence that has been performed on the video clip by:
      comparing a top field of a current frame with a bottom field of the current frame;
      comparing the top field of the current frame with a top field of a previous frame; and
      comparing the top field of the current frame with a bottom field of a previous frame;
   confirming the telecine cadence by determining that an active cadence matches an expected cadence by comparing a non-repeated field within a periodicity;
   performing an inverse telecine on the video clip; and
   determining whether the telecine cadence has been changed as a result of the inverse telecine performed on the video clip.

2. The method of claim 1, wherein the detecting of the telecine cadence further comprises using cross-frame variances of the video clip.

3. The method of claim 1, further comprising:
   determining if the telecine cadence of the video clip has been altered; and
   locking in the detected telecine cadence.

4. The method of claim 3, further comprising:
   determining if the change is a result of one or more of frame editing, and frame shifting.

5. The method of claim 4, wherein if one of frame editing, and frame shifting has occurred, identifying an associated shift pattern.

6. The method of claim 1, wherein the detecting of the telecine cadence further comprises:
   comparing the bottom field of the current frame with the bottom field of the previous frame; and
   comparing the bottom field of the current frame with the top field of the previous frame.

7. The method of claim 6, wherein the comparisons are preformed using one or more of mean-square-error, signal-to-noise ratio (PSNR), and sum-absolute-difference (SAD).

8. The method of claim 1, further comprising:
   rendering the video clip with an original fps value if it is determined that the original fps value has been maintained.

9. A non-transitory machine-readable medium including sets of instructions which, when executed by a machine, cause the machine to:
   receive a video clip including a plurality of frames;
   determine a telecine cadence that has been performed on the video clip by:
      comparing a top field of a current frame with a bottom field of the current frame;
      comparing the top field of the current frame with a top field of a previous frame; and
      comparing the top field of the current frame with a bottom field of a previous frame;
   confirm the telecine cadence by determining that an active cadence matches an expected cadence by comparing a non-repeated field within a periodicity;
   perform an inverse telecine on the video clip; and
   determine whether the telecine cadence has been changed as a result of the inverse telecine performed on the video clip.

10. The machine-readable medium of claim 9, wherein if one of frame editing, and frame shifting has occurred, the sets of instructions which, when further executed by the machine, cause the machine to identify an associated shift pattern.

11. The machine-readable medium of claim 9, wherein the detecting of the telecine cadence further causes the machine to:
   compare the bottom field of the current frame with the bottom field of the previous frame; and
   compare the bottom field of the current frame with the top field of the previous frame.

12. The machine-readable medium of claim 11, wherein the sets of instructions which, when further executed by the machine, cause the machine to perform the comparisons on a sup-sampling pattern of the plurality of frames.

13. The machine-readable medium of claim 9, wherein the sets of instructions which, when further executed by the machine, cause the machine to confirm the telecine cadence by checking that a current fps value matches an expected fps value.

14. A system comprising:
   a central processing unit (CPU);
   an input/output (I/O) controller coupled to the CPU; and
   a graphics interface card couple to the I/O controller to receive a video clip including a plurality of frames, determine if a telecine cadence that has been performed on the video clip by comparing a top field of a current frame with a bottom field of the current frame, comparing the top field of the current frame with a top field of a previous frame and comparing the top field of the current frame with a bottom field of a previous frame, confirm the telecine cadence by determining that an active cadence matches an expected cadence by comparing a non-repeated field within a periodicity, perform an inverse telecine on the video clip and determine whether the telecine cadence has been changed as a result of the inverse telecine performed on the video clip.

15. The system of claim 14, wherein the graphics interface card is further to lock in the cadence, and determine whether the cadence has subsequently changed.

16. The system of claim 15, wherein the graphics interface card is further to determine if the change is a result of one or more of frame editing, and frame shifting.

17. The system of claim 14, wherein the graphics interface card further to compare the bottom field of the current frame with the bottom field of the previous frame, and compare the bottom field of the current frame with the top field of the previous frame.

* * * * *